Sept. 12, 1967     G. D. BALDWIN ETAL     3,341,802
ADJUSTABLE MOUNTING FOR VEHICLE LIGHTS
Filed June 12, 1964     4 Sheets-Sheet 1

George D. Baldwin
Daniel Sakuta
INVENTORS

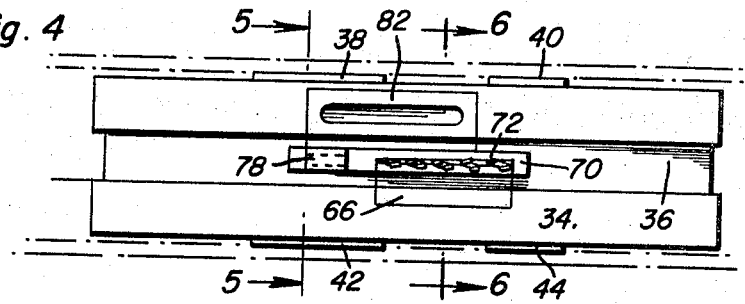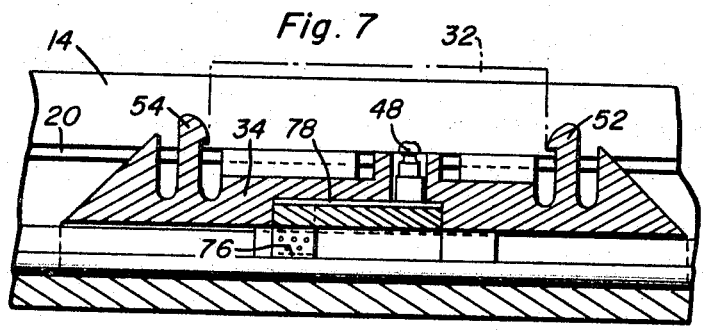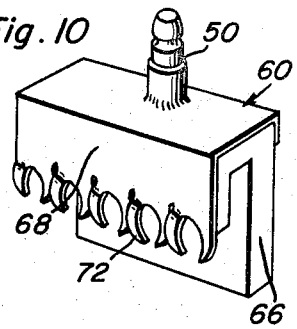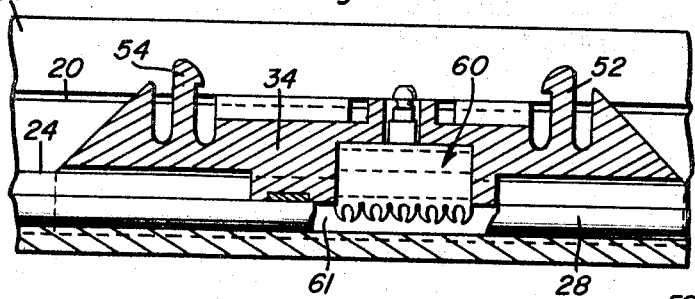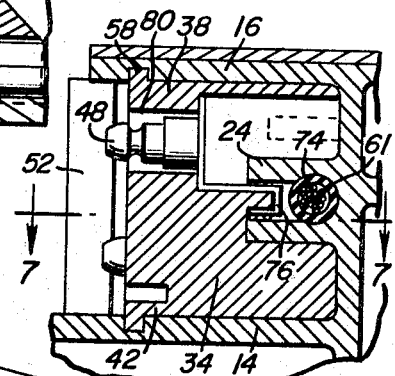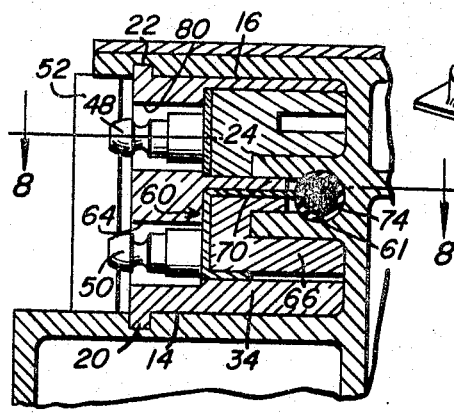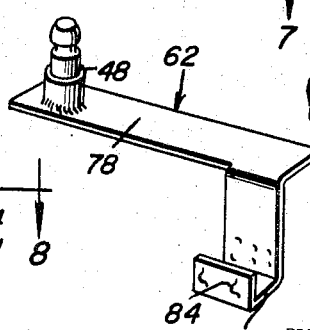

Sept. 12, 1967   G. D. BALDWIN ET AL   3,341,802
ADJUSTABLE MOUNTING FOR VEHICLE LIGHTS
Filed June 12, 1964   4 Sheets-Sheet 3
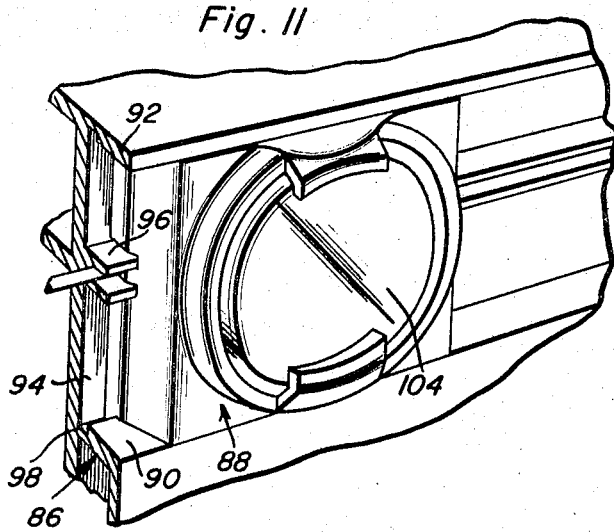
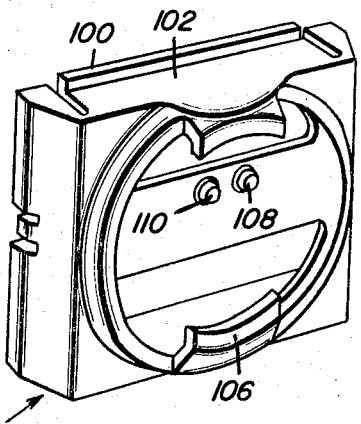
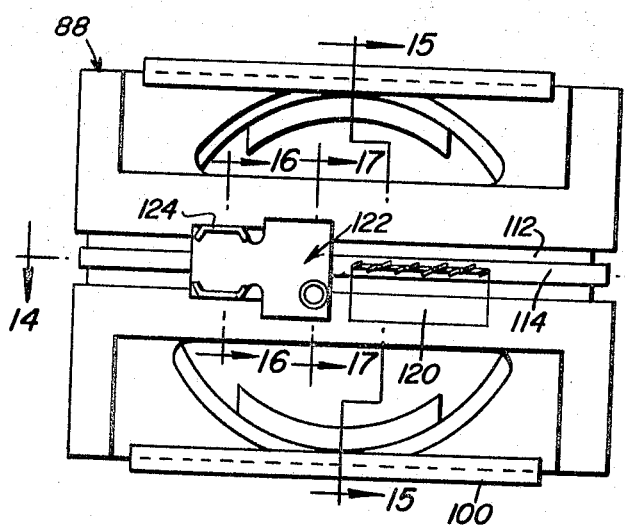
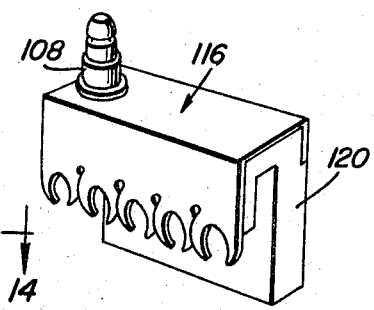
George D. Baldwin
Daniel Sakuta
INVENTORS Sept. 12, 1967  G. D. BALDWIN ETAL  3,341,802
ADJUSTABLE MOUNTING FOR VEHICLE LIGHTS
Filed June 12, 1964  4 Sheets-Sheet 4
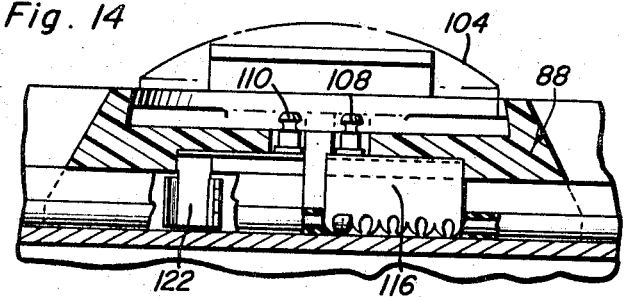
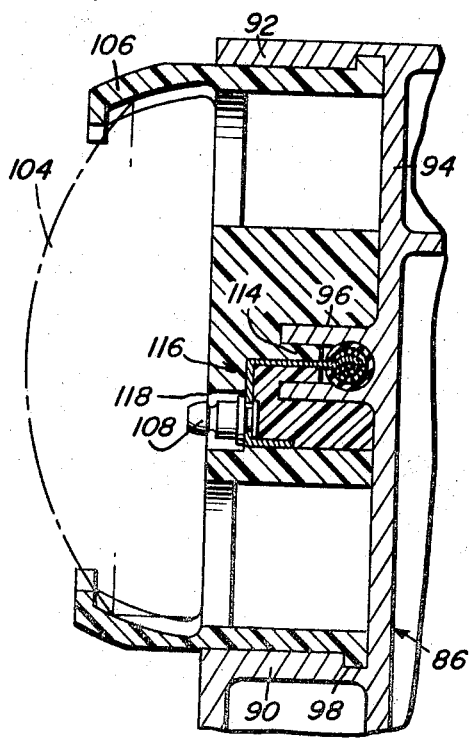
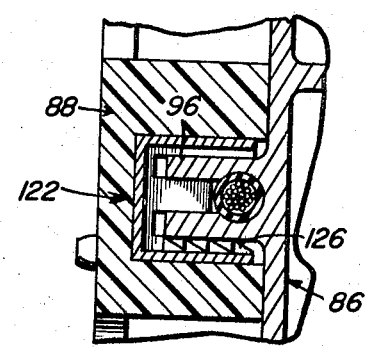
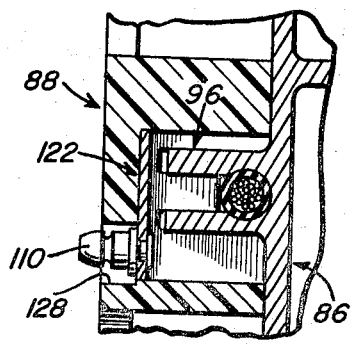
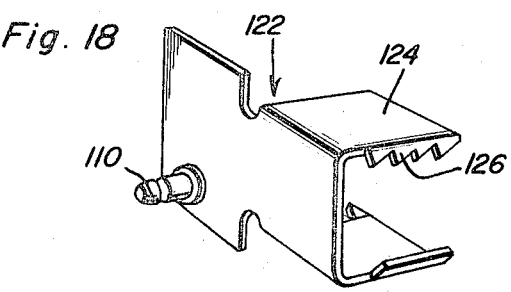
George D. Baldwin
Daniel Sakuta
INVENTORS United States Patent Office 3,341,802
Patented Sept. 12, 1967

3,341,802
ADJUSTABLE MOUNTING FOR VEHICLE LIGHTS
George D. Baldwin, Jamestown, N.Y., and Daniel Sakuta, Erie, Pa., assignors to Truck-Lite Co., Inc., Jamestown, N.Y., a corporation of New York
Filed June 12, 1964, Ser. No. 374,799
17 Claims. (Cl. 339—21)

This invention relates to the mounting of lamp units on a vehicle body or similar installations and involves the use of a lamp holder of the type disclosed in prior copending application Ser. No. 231,442 filed Oct. 18, 1962, now Patent No. 3,218,448, issued Nov. 16, 1965, related to the instant application by a common assignee.

The lamp mounting arrangement of the present invention is particularly adaptable to trailer vehicle body constructions which involve an elongated channel frame formation disposed adjacent the top of the vehicle body for support of the roof panel thereon. It has heretofore been proposed to mount lamp units within this channel formation, establishing electrical contact with a power cable which extends through the channel formation externally of the vehicle body. The lamp mounting arrangements heretofore proposed in connection with the aforementioned environment, have been found to be less practicable than previous installations for vehicle lamps inasmuch as it was found necessary to utilize fasteners and form fastener receiving apertures in the body construction so as to securely mount the lamp unit in place and establish firm electrical contact. The drilling of holes in the vehicle body for such purpose and the locational limitations imposed thereby as well as the time involved in the use of necessary tools in connection with the fasteners, have been eliminated by the lamp mounting arrangement of the present invention. Installation of lamp units within the aforementioned channel formation at any desired location is therefore one of the important contributions of the present invention.

As an additional object of the present invention, the lamp mounting arrangement makes possible the mounting of lamps without the use of fasteners and tools and yet establishes a firm electrical connection protected from the corrosive effects of weather. The electrical connections are established with the power cable by the cable piercing method simultaneously with the establishment of ground contact between one of the lamp terminals and the vehicle body surface. These electrical connections are established at the same time that the lamp mounting is locked in place.

A still further object of the present invention is to provide a novel lamp holder construction adapted to be inserted between the leg portions of a channel formation for mounting therebetween, the lamp holder embedding a cable piercing element aligned with the ground contact member, said element and member being respectively connected to terminal elements which project from the lamp holder so that they may be received by the socket elements of a lamp unit adapted to be held in the lamp holder between a pair of gripping arms.

In accordance with the foregoing objects, the lamp holder of the present invention features a cable piercing element provided with a plurality of prongs, alternative prongs being laterally deflected in opposite directions so as to pierce the power cable and grip therebetween the conductive strands extending through the cable sheathing not only to establish good electrical contact therewith but to also lock the lamp holder against movement relative to the power cable in an axial direction.

Yet another object of the present invention is to provide a lamp holder in association with a channel formation having a cross-sectional shape with extruded modifications so as to enable insertion of the lamp holder by a predetermined amount into a position in which the lamp holder becomes locked between the leg portions of the channel formation by resilient locking side portions and straddling a cable seating groove formation through which the power cable extends. Insertion of the lamp holder by this predetermined amount into the locking position, is also operative to simultaneously cause a conductive element to pierce the cable in order to establish electrical connection with the strands thereof and bring another conductive element into firm groundinig contact with the vehicle body.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 4 is a bottom plan view of the lamp holder shown installed in FIGURE 2.

FIGURE 5 is a transverse sectional view taken substantially through a plane indicated by section line 5—5 in FIGURE 4.

FIGURE 6 is a transverse sectional view taken substantially through a plane indicated by section line 6—6 in FIGURE 4.

FIGURE 7 is a longitudinal sectional view through the lamp holder taken substantially through a plane indicated by section line 7—7 in FIGURE 5.

FIGURE 8 is a sectional view through the lamp holder taken substantially through a plane indicated by section line 8—8 in FIGURE 6.

FIGURE 9 is a perspective view of the ground contact member embedded in the lamp holder.

FIGURE 10 is a perspective view of the cable piercing element embedded in the lamp holder.

FIGURE 11 is a perspective view of another form of lamp mounting installation.

FIGURE 12 is a perspective view of the form of lamp holder utilized in the installation of FIGURE 11.

FIGURE 13 is a bottom plan view of the lamp holder shown installed in FIGURE 11.

FIGURE 14 is a sectional view taken substantially through a plane indicated by section line 14—14 in FIGURE 13.

FIGURE 15 is a sectional view taken substantially through a plane indicated by section line 15—15 of FIGURE 13.

FIGURE 16 is a partial sectional view taken substantially through a plane indicated by section line 16—16 in FIGURE 13.

FIGURE 17 is a partial sectional view taken substantially through a plane indicated by section line 17—17 in FIGURE 13.

FIGURE 18 is a perspective view of the ground contact member embedded in the lamp holder illustrated in FIGURES 11 through 17.

FIGURE 19 is a perspective view of the cable piercing element embedded in the holder illustrated in FIGURES 11 through 17.

Figure 1:
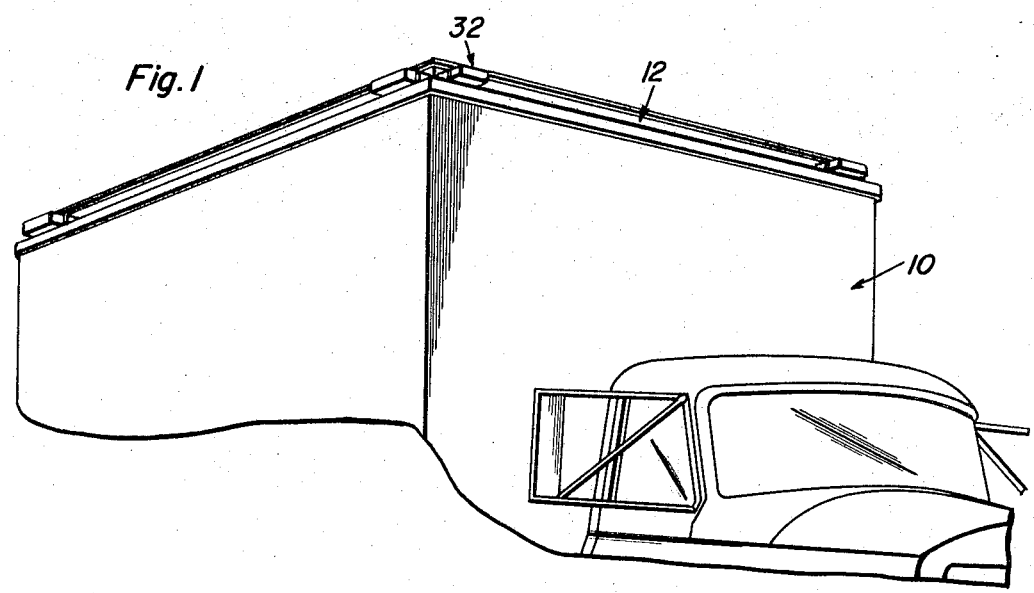
FIGURE 1 is a partial perspective view of a typical lamp installation embodying the principles of the present invention.

Referring now to the drawings in detail, it will be observed that the lamp mounting installations of the present invention are on a vehicle body generally referred to by reference numeral 10 in FIGURE 1 provided adjacent the top thereof, with an elongated channel formation generally referred to by reference numeral 12 which is a commonplace structural feature of such vehicle bodies. As more clearly seen in FIGURE 2, the channel formation 12 includes a bottom leg portion 14 and a top leg portion 16, said leg portions being parallel spaced and projecting from an interconnecting web portion 18. In the particular installation illustrated, the bottom leg portion 14 is provided with a locking groove 20 spaced from the web portion 18 and aligned with the locking groove 22 on the confronting face of the upper leg portion 16. Also formed on the web portion 18 and projecting therefrom in parallel spaced relation between the leg portions, is a seating groove formation 24 having an elongated groove 26 formed therein within which there is seated an electrical power cable 28. It will therefore be apparent, that the channel formation 12 has an extruded cross-sectional shape modified by the provision of the locking grooves 20 and 22 and the groove formation 24 for the purposes of the present invention. It will therefore be appreciated, that a relatively inexpensive modification is involved in connection with the fabrication of the channel formation so as to accommodate the lamp mounting facilities of the present invention.

Figure 2:
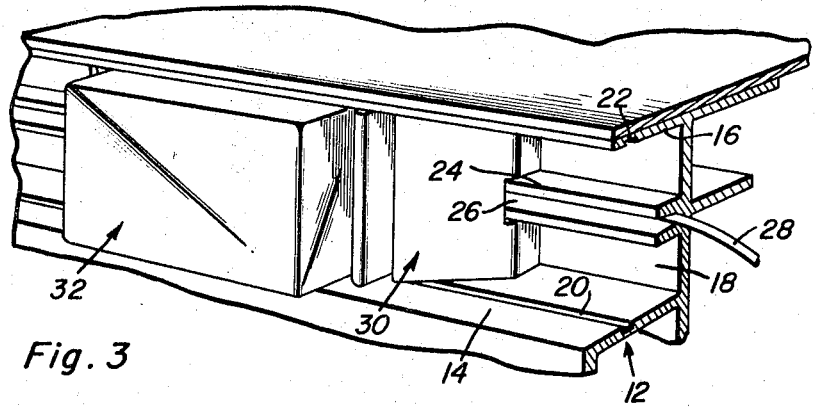
FIGURE 2 is an enlarged partial perspective view of a portion of the structure illustrated in FIGURE 1 showing one of a plurality of lamp mounting installations.
Figure 3:
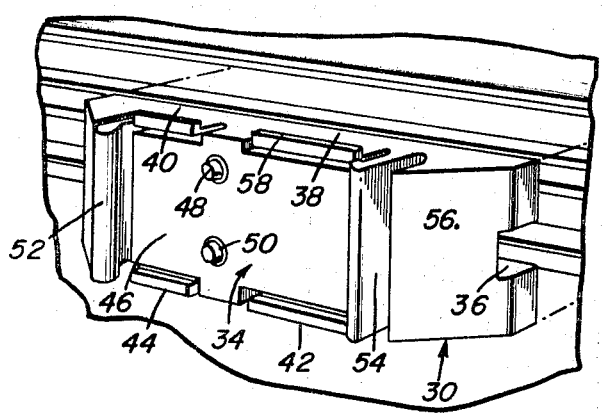
FIGURE 3 is a partial perspective view of a lamp holder before installation and with the lamp unit removed.

With continued reference to FIGURE 2, it will be observed that a plurality of lamp assemblies may be installed within the channel formation 12 at any desired locations and toward this end, each lamp assembly consists of a lamp holder generally referred to by reference numeral 30 and a replaceable lamp unit 32.

The lamp unit 32 is therefore held within the lamp holder 30 which in turn is received between the leg portions 14 and 16 of the channel formation in overlying relation to the groove formation 24 within which the electrical power cable 28 is seated.

Referring now to FIGURES 3 through 8, it will be observed that the lamp holder 30 includes a body 34 made of a suitable electrically non-conductive material. The body 34 is elongated in a direction parallel to the leg portions of the channel formation for insertion therebetween. Formed in the bottom of the body 34, and extending longitudinally thereof, is a body positioning slot 36 arranged to receive the groove formation 24 therethrough when the body is inserted into the channel formation. The width of the body is therefore dimensioned for reception between the confronting faces of the leg portions 14 and 16 with a fit loose enough to permit easy insertion. Locking means is however provided so as to hold the body in place between the leg portions when it is inserted by a predetermined amount. The locking means may therefore be in the form of flexible side portions 38, 40, 42 and 44 integrally formed with the body 34 and spaced from the flat lamp receiving surface 46 as more clearly seen in FIGURE 3. The flexible side portions are also disposed on opposite sides of a pair of projecting bulb terminal elements 48 and 50. The terminal elements 48 and 50 are disposed in closer spaced relation to a gripping arm 52 than to the gripping arm 54, said gripping arms projecting from the holder body spaced between the lamp receiving surface 34 and the sloping end portions 56 of the holder body. The lamp unit 32 may therefore be received between the gripping arms 52 and 54 and locked in place on the surface 46 by reception of the terminals 48 and 50 in the projecting lamp bulb sockets because of the unequal spacing of the terminals 48 and 50 between the gripping arms as more specifically described in the aforementioned Patent No. 3,218,448. However, unlike the lamp holder disclosed in the aforesaid patent, the lamp holder 30 is locked in place without the use of any fasteners by means of the resilient side portions 38, 40, 42 and 44. Each of the resilient side portions is therefore provided with a locking flange 58, so that when the holder is fully inserted, the locking flanges will be received within the locking grooves 20 and 22 formed in the leg portions of the channel formation. Therefore, when being inserted between the leg portions, the flexible side portions will be deflected toward the lamp receiving surface portion 46 from which they are spaced in the undeflected state.

It will therefore be apparent from the foregoing, that when the lamp holder is inserted in the channel formation by a predetermined amount, the locking flanges 58 will securely hold the lamp holder against withdrawal from the channel formation. This locking of the lamp holder in place, is arranged to occur only after firm electrical connections are made between the projecting terminals 48 and 50 with the conductor strands 61 of the power cable 28 and the surface of the vehicle body respectively. Toward this latter end, the terminal prong 50 is connected as by welding to a cable piercing element 60 as more clearly seen in FIGURE 10, while the terminal prong 48 is connected as by welding to a ground contact member 62 as more clearly seen in FIGURE 9. The cable piercing element 60 may be embedded in any suitable fashion within the body of the lamp holder so that the terminal prong 50 connected thereto may project from the holder through a bore 64 formed therein. The cable piercing element may therefore be seated on a backing portion 66 insertable into a receiving opening formed in the bottom of the holder body as more clearly seen in FIGURE 4 and then cemented in place. The cable piercing element is provided with a portion 68 sleeved by a longitudinally extending portion 70 of the holder body disposed within the slot 36 thereof. The portion 68 of the cable piercing element is provided with a plurality of longitudinally spaced prongs 72 which project from the projecting sleeve portion 70 for piercing the insulation 74 of the power cable 28 as more clearly seen in FIGURES 6 and 8. Alternate cable piercing prongs 72 are deflected laterally from the portion 68 of the element 60 so that they grip the conductor strands 61 therebetween not only to establish a good electrical connection between the conductor strands and the element 60 but to also lock the holder body within which the element 60 is embedded, against displacement relative to the power cable 28. The cable 28 will therefore be suitably anchored externally on the vehicle body against axial displacement.

Also embedded in any suitable fashion within the holder body, is the ground contact member 62 to which the terminal prong 48 is connected. The contact member may therefore be provided with a resilient wedging portion 76 extending from the slot 36 into the groove 26 of the groove formation 24 in longitudinal alignment with the cable piercing prongs 72 cooperating to operatively position the body 34 between the legs 20 and 22 of the channel along the length of the body. Accordingly, the portion 76 of the contact member 62 projects from an elongated portion 78 to which the terminal prong 48 is connected so that it may extend from the holder body through the bore 80. The contact member 62 may therefore be embedded in the holder body through an opening formed therein which is closed by an insert portion 82 cemented in place as more clearly seen in FIGURE 4. The resilient portion 76 of the contact member which projects into the groove of the groove formation 24, may be provided with external projections 84 as more clearly seen in FIGURES 5 and 9 so as to establish good electrical contact with the conductive surface of the vehicle body.

Referring now to FIGURES 11 through 18, another form of lamp mounting is illustrated based upon essentially the same principles embodied in the lamp mounting described in connection with FIGURES 1 through 10. As more clearly seen in FIGURES 11 and 15, the channel formation 86 associated with the lamp holder 88 to be mounted therein, includes lower and upper leg portions 90 and 92 interconnected by the web portion 94 on which the cable seating groove formation 96 is mounted similar to the groove formation described in connection with the first embodiment. The leg portions 90 and 92 of the channel formation 86 however, are modified by provision of locking grooves 98 which are located adjacent the intersection of the leg portions with the web portion 94. Accordingly, the lamp holder 88 will be locked in place between the leg portions when locking flanges 100 are received within the locking grooves 98, the locking flanges being formed at the bottom of the lamp holder 88 and extending laterally from the resilient side portions 102 thereof.

The lamp holder 88 is adapted to hold a circular shaped lamp unit 104 as shown in FIGURE 11, the lamp unit being held on the holder between the arcuate gripping arms 106 operative to lock the lamp unit in place with the projecting terminal sockets thereof receiving the terminal prongs 108 and 110 as more clearly shown in FIGURE 12. The terminal prongs 108 and 110 are therefore unequally spaced between the gripping arms 106 so as to lock the lamp unit to the holder in a manner similar to that described in connection with the lamp holder 30 of the first embodiment.

In order to straddle the groove formation 96, the lamp holder 88 is provided with a pair of parallel grooves 112 formed in the bottom of the lamp holder as more clearly seen in FIGURE 13, the grooves being separated by the spacer portion 114 which projects into the groove of the groove formation 96 as more clearly seen in FIGURE 15. The spacer portion 114 therefore sleeves the projecting portion of the cable piercing element 116 which is similar in construction and function to the cable piercing element 60 described in connection with the first embodiment. The terminal prong 108 is therefore connected to the cable piercing element 116 and projects from the holder through the bore 118 formed therein as more clearly seen in FIGURE 15. The cable piercing element 116 may therefore be embedded in the holder body by insertion thereof through an opening formed therein into which the backing insert portion 120 is inserted and cemented in place. The cable piercing element will therefore pierce the power cable and lock the holder thereto in an axial direction in a manner similar to that described with respect to the first embodiment.

The terminal prong 110 is connected to a modified form of grounding contact member 122 as more clearly seen in FIGURE 18. The grounding contact member is therefore suitably embedded in the holder body 88 and includes a pair of projecting portions 124 which straddle the groove formation 96 so as to cause the serrated teeth 126 formed thereon to bite into the surface of the groove formation in order to establish good grounding contact as more clearly seen in FIGURE 16. The terminal prong 110 connected to the contact member 122 therefore extends through the bore 128 from the holder body. Thus, when the holder 88 is fully inserted and locked in place, the longitudinally aligned cable piercing element 116 and ground contact member 122 will simultaneously establish electrical connections with the socket terminals of the lamp unit receiving the terminal prongs 108 and 110, respectively connected to the cable piercing element and the ground contact member.

From the foregoing description, the construction, operation and utility of the lamp mounting installations will be apparent. It will therefore be appreciated, that the applicants' invention represents a significant contribution to the vehicle lamp mounting art in that it permits selective installation of a lamp holder at any desired location within the channel formation of the vehicle body without the use of any fasteners or tools or any drilling of apertures in the vehicle body for installational purposes. Furthermore, the lamp holder and lamp unit mounted thereon when so installed establishes a protected electrical connection to the externally mounted power cable as well as a protected ground connection. The electrical connection to the power cable utilizes the cable piercing principle that cooperates with the locking of the lamp holder against withdrawal from the channel formation to firmly anchor the lamp assembly in place.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to falling within the scope of the invention as claimed.

What is claimed as new is as follows:

1. In combination with a channel formation on a vehicle body having parallel spaced leg portions interconnected by a web portion, a lamp holder mounted at any selected location in said channel formation in overlying relation to an insulated power cable extending through said channel formation and mounted on the web portion thereof, said lamp holder comprising; a non-conductive body insertable between the leg portions of said channel formation, a cable piercing element embedded in said body and projecting therefrom for piercing said power cable when the body is inserted between the leg portions, a grounding contact member embedded in said body and projecting therefrom spaced from the cable piercing element longitudinally of the body, and locking means mounted on the body in laterally spaced relation to the grounding contact member for locking the body between the leg portions upon insertion therebetween by a predetermined amount establishing electrical contact between the cable piercing element and the power cable and between the web portion and the grounding contact member.

2. The combination of claim 1 wherein said leg portions of the channel formation are formed with locking grooves, said locking means including resilient side portions integral with the body having locking flanges received within said locking grooves upon insertion of said body by said predetermined amount.

3. In combination with a channel formation on a vehicle body having parallel spaced leg portions interconnected by a web portion, a lamp holder mounted at any selected location in said channel formation in overlying relation to an insulated power cable extending through said channel formation and mounted on the web portion thereof, said lamp holder comprising; a body insertable between the leg portions of said channel formation, a cable piercing element embedded in said body and projecting therefrom for piercing said power cable when the body is inserted between the leg portions, a grounding contact member embedded in said body and projecting therefrom in spaced relation to the cable piercing element, and locking means mounted on the body for locking thereof between the leg portions upon insertion of the body therebetween by a predetermined amount establishing electrical contact between the cable piercing element and the power cable and between the web portion and the grounding contact member, said cable piercing element including a plurality of longitudinally spaced prongs, alternate prongs being transversely deflected in opposite directions for locking the power cable to the body against relative displacement in a direction parallel to said leg portions.

4. The combination of claim 3, including a pair of gripping arms projecting from the body for holding a lamp unit therebetween, and a pair of terminals respectively connected to said cable piercing element and the grounding contact member projecting from the body between said gripping arms for electrical contact with the lamp unit.

5. The combination of claim 4 wherein said web portion of the channel formation is formed with a seating groove in which the power cable is mounted and into which the cable piercing element projects for piercing of the cable, said grounding contact member being aligned with the cable piercing element for simultaneous insertion into the seating groove.

6. The combination of claim 5 wherein said leg portions of the channel formation are formed with locking grooves, said locking means including resilient side portions on the body having locking flanges received within said locking grooves upon insertion of said body by said predetermined amount.

7. The combination of claim 6 wherein said grounding contact member includes a resilient wedging portion within the seating groove having surface projections for establishing contact with the web portion.

8. In combination with a channel formation on a vehicle body having parallel spaced leg portions interconnected by a web portion, a lamp holder mounted at any selected location in said channel formation in overlying relation to an insulated power cable extending through said channel formation and mounted on the web portion thereof, said lamp holder comprising; a body insertable between the leg portions of said channel formation, a cable piercing element embedded in said body and projecting therefrom for piercing said power cable when the body in inserted between the leg portions, a grounding contact member embedded in said body and projecting therefrom in spaced relation to the cable piercing element and locking means mounted on the body for locking thereof between the leg portions upon insertion of the body therebetween by a predetermined amount establishing electrical contact between the cable piercing element and the power cable and between the web portion and the grounding contact member, said web portion of the channel formation being formed with a seating groove in which the power cable is mounted and into which the cable piercing element projects for piercing of the cable, said grounding contact member being aligned with the cable piercing element for simultaneous insertion into the seating groove.

9. In combination with a channel formation on a vehicle body having parallel spaced leg portions interconnected by a web portion, a lamp holder mounted at any selected location in said channel formation in overlying relation to an insulated power cable extending through said channel formation and mounted on the web portion thereof, said lamp holder comprising; a body insertable between the leg portions of said channel formation, a cable piercing element embedded in said body and projecting therefrom for piercing said power cable when the body is inserted between the leg portions, a grounding contact member embedded in said body and projecting therefrom in spaced relation to the cable piercing element and locking means mounted on the body for locking thereof between the leg portions upon insertion of the body therebetween by a predetermined amount establishing electrical contact between the cable piercing element and the power cable and between the web portion and the grounding contact member, said web portion of the channel formation being formed with a seating groove in which the power cable is mounted and into which the cable piercing element projects for piercing of the cable, said grounding contact member being aligned with the cable piercing element for simultaneously straddling the seating groove.

10. In combination with a channel formation on a vehicle body having parallel spaced leg portions interconnected by a web portion, a lamp holder mounted at any selected location in said channel formation in overlying relation to an insulated power cable extending through said channel formation and mounted on the web portion thereof, said lamp holder comprising; a body insertable between the leg portions of said channel formation, a cable piercing element embedded in said body and projecting therefrom for piercing said power cable when the body is inserted between the leg portions, a grounding contact member embedded in said body and projecting therefrom in spaced relation to the cable piercing element and locking means mounted on the body for locking thereof between the leg portions upon insertion of the body therebetween by a predetermined amount establishing electrical contact between the cable piercing element and the power cable and between the web portion and the grounding contact member, said grounding contact member including a resilient wedging portion extending from the body spaced from the locking means and the leg portions of the channel formation having surface projections for establishing contact with the web portion.

11. In combination with a channel formation on a vehicle body having parallel spaced leg portions interconnected by a web portion, a lamp holder mounted at any selected location in said channel formation in overlying relation to an insulated power cable extending through said channel formation and mounted on the web portion thereof, said lamp holder comprising; a body insertable between the leg portions of said channel formation, piercing means mounted in the body and responsive to insertion thereof by a predetermined amount into the channel formation for piercing the power to establish electrical contact therewith, and locking means mounted on the body and engageable with said leg portions for locking the body therebetween only when inserted by said predetermined amount, said piercing means comprising prongs, alternate prongs being transversely deflected in opposite directions for locking the power cable to the body against relative displacement in a direction parallel to said leg portions.

12. The combination of claim 11 wherein said leg portions of the channel formation are formed with locking grooves, said locking means including resilient side portions on the body having locking flanges received within said locking grooves upon insertion of said body by said predetermined amount.

13. In combination with a channel having spaced legs interconnected by an electrically conductive web surface and an insulated electrical cable mounted in a groove formation projecting from the web surface, a lamp device including, a body having positioning means for operatively positioning the body between the legs when seated on the web surface including a slot formed in the body engaging the groove formation, prong means mounted by the body for piercing said cable when the body is seated on the web surface and a ground contact member mounted by the body within the slot, said ground contact member engaging the groove formation when the body is seated on the web surface.

14. The combination of claim 13 wherein said prong means includes a plurality of longitudinally spaced prongs laterally deflected and piercing the cable within the groove formation.

15. The combination of claim 14 wherein said body includes laterally deflectable elements in operative locking engagement with the legs when the body is operatively positioned therebetween and seated on the web surface.

16. The combination of claim 13 wherein said body includes laterally deflectable elements in operative locking engagement with the legs when the body is operatively positioned therebetween and seated on the web surface.

17. In combination with a channel having spaced legs interconnected by an electrically conductive web surface and an insulated electrical cable mounted in a groove formation projecting from the web surface, a lamp device including, a body having positioning means engageable with the groove formation for operatively positioning the body between the legs when seated on the web surface, prong means mounted by the body for piercing said cable and preventing longitudinal displacement of the body relative thereto when the body is seated on the web surface and a ground contact member mounted by the body in spaced relation to the legs, said positioning means including a slot in the body receiving said groove formation and means mounting the ground contact member within the slot for engagement with the groove formation in longitudinally spaced relation to the prong means.

References Cited

UNITED STATES PATENTS

| | | | |
|---|---|---|---|
| 671,338 | 4/1901 | Halford | 339—21 |
| 2,261,986 | 11/1941 | Frank et al. | 339—21 |
| 2,658,184 | 11/1953 | Greenbaum | 339—99 |
| 3,130,921 | 4/1964 | Morgan | 240—8.2 |
| 3,187,172 | 6/1965 | Knapp et al. | 240—8.2 |
| 3,218,448 | 11/1965 | Cala | 240—8.2 |

MARVIN A. CHAMPION, *Primary Examiner.*

PATRICK A. CLIFFORD, *Assistant Examiner.*